2,983,702

METHOD OF MAKING POLYURETHANE ELASTOMER FROM POLYESTER, ORGANIC DIISOCYANATE, AND BIFUNCTIONAL PRIMARY AMINE

Julian R. Little, Packanack Lake, and William P. Whelan, Jr., Passaic, N.J., assignors to United States Rubber Company, New York, N.Y., a corporation of New Jersey No Drawing. Filed Feb. 24, 1958, Ser. No. 716,846

11 Claims. (Cl. 260—45.4)

This invention relates to a method of making polyurethane elastomers. More particularly it relates to a new method of combining polyurethane elastomer-forming ingredients that leads consistently to a stable raw elastomer having highly desirable reproducible characteristics.

It is well known in the art that air-stable polyurethane elastomers may be formed by combining the following three ingredients: (1) a polymer (such as a polyester) containing hydroxyl end groups; (2) an organic diisocyanate which reacts with the hydroxyl groups of said polymer to form a polyurethane; and (3) a "bifunctional additive" such as a glycol, diamine, aminoalcohol, etc. in the proper proportions. These elastomers may be cured by the action of heat and additional diisocyanate. Some of the early patents are as follows:

(1) U.S. Pat. 2,621,166 of December 9, 1952 by Schmidt & Muller, and its corresponding Brit. Pat. 700,610 of December 9, 1953, and its antecedent Ger. Pat. 838,652 of May 12, 1952.

(2) U.S. Pat. 2,625,531 of January 13, 1953 by Seeger, and its corresponding Brit. Pat. 696,449 of September 2, 1953.

(3) U.S. Pat. 2,625,532 of January 13, 1953 by Seeger, and its corresponding Brit. Pat. 696,450 of September 2, 1953.

Briefly, in the conventional air-stable polyurethane polymer the sum of the active hydrogen atoms from the polyester and from the bifunctional additive is approximately equal to the number of equivalents of isocyanate. The composition and properties of these materials are well known, and this invention relates only to a method of making them.

Two methods of combining the starting materials are as follows:

(1) Mix together all three ingredients at the start.
(2) Mix all of the polyester with all of the diisocyanate and allow them to react for some time before adding the bifunctional additive. A variation of this second method, disclosed in U.S. Patent 2,625,531 referred to above is the incremental addition of the bifunctional additive to the reacting polyester-diisocyanate mixture.

It is attempted to use, as the bifunctional additive, a material having at least one primary amine group, (e.g., a diamine, aminoalcohol, etc.) in the foregoing methods unsatisfactory results are obtained. The first method tends to give a milky, inhomogeneous product. In the second method it is difficult to avoid either the formation of grainy, inhomogeneous products, or products which scorch at room temperature during subsequent compounding with diisocyanate curatives, and the products have erratically varying characteristics so that it is virtually impossible to reproduce consistently a product having desired properties, especially on a large scale. In this second method the polyester and the diisocyanate are mixed and allowed to react for some time before adding the diamine. In trying to judge the correct time for the diamine addition the operator must estimate the optimum moment between the following two recognizable extremes. "Too early" addition results in precipitation of insoluble ureas as noted with Method 1. "Too late" addition of diamine results in a raw polymer with amine end groups which will scorch easily during subsequent compounding with diisocyanate curatives. Even when these two extremes are avoided it has been found that the correct time for diamine addition is extremely critical, differences of a few minutes resulting in large differences in properties of the final rubber. This leads to very serious problems in reproducibility which makes the process unsuitable for large scale production. The only reliable criterion for diamine addition is the molecular weight of the reacting polyester-diisocyanate mixture. This molecular weight can be estimated by measuring viscosity but to be effective the measurement must be continuous and must be corrected for differences in temperature. Even with instrumentation of this type, the method is very difficult to operate on a large scale because the time of diamine addition is so critical.

We have now found, unexpectedly, that if the diisocyanate is first reacted with a part only of the required polyester, and the remainder of the polyester is subsequently added, followed by the addition of a bifunctional additive containing at least one amine group, there can be obtained consistently a raw polyurethane elastomer which is free from graininess and inhomogeneity, and which is stable and does not tend to scorch at room temperature when compounded with diisocyanate curatives. This raw elastomer can be cured, after addition of more polyisocyanate, to form a good quality rubber.

The three essential ingredients employed in the present process are known ingredients. Thus, starting polymers having alcoholic hydroxyl end groups are typified by the conventional polyesters usually used in making polyurethane elastomers. Such polyesters are shown in the patent and technical literature (cf., e.g., U.S. Patents 2,606,162, Coffee et al., Augush 5, 1952 and 2,751,363, Martin, June 19, 1956, the disclosures of which are hereby incorporated herein by reference) and require no detailed description here. As described in the prior art, such polyesters are typically derived from glycols and dicarboxylic acids. For purposes of the invention we include among the polyesters as equivalents thereof the poly-etheresters such a poly diethylene glycol adipate and the polyester amides such as polyethylene glycol hexamethylene diamine adipate-adipamide. Equivalent polyamides, or polyethers such as polyethylene glycol or polytetramethylene glycol may be used, or any other known equivalent polymers conventionally used in the preparation of polyurethane elastomers may be employed. Usually the polymers have a molecular weight of from 500 to 5000.

As for the organic diisocyanates, these too are well known and are described in detail in conjunction with the preparation of polyurethane rubbers in the cited Martin patent and elsewhere in the literature (cf. e.g., U.S. Patent 2,721,811, Dacey et al., October 25, 1955). To avoid needless repetition the disclosure of suitable diisocyanates in said references is incorporated herein by reference.

The third essential ingredient, the bifunctional additive, may be any bifunctional organic material having at least one primary amine group. These materials are bifunctional in the sense that they possess two groups having active hydrogen atoms capable of reacting with isocyanate groups. Examples of such materials are diamines such as hexamethylene diamine or p,p'-diamino diphenyl methane, and mono amines such as aminophenols or aminoalcohols, e.g., p-aminophenol, m-aminophenol, p-aminobenzylalcohol, ethanolamine, etc.

The over-all proportions of polyester, diisocyanate and bifunctional additive in the present process are also the same as in conventional practice, that is, we employ 1 mole of polyester, from 0.06 to 0.48 mole of bifunctional additive and from 0.8 to 1.5 mole of diisocyanate, with the added proviso (as is conventional) that the sum of the active hydrogen atoms in the polyester and in the bifunctional additive is approximately equal to the number of equivalents of isocyanate.

In addition to the foregoing essential ingredients there may be present, at various stages of the preparation, other modifying ingredients such as trialcohols, triisocyanates, or various catalysts or retarders, as will appear in more detail below.

In accordance with the invention all of the diisocyanate is first reacted with a portion only of the polyester or the like containing alcoholic hydroxyl end groups, to form a prepolymer. In making the prepolymer we typically employ in accordance with this invention only 45 to 90% of the total amount of polyester, that is, 55 to 10% of the polyester is held back and is added during the second stage of the process. More preferably, we employ 55 to 70% of the total polyester in the first stage. It will be understood that the isocyanate groups react with the hydroxyl end groups of the polyester, yielding an extended polymer of higher molecular weight and greater viscosity than the polyester. The reaction between the polyester and the diisocyanate takes place at room temperature, but it is preferred in practice to heat the mixture, usually while working it in a suitable plastic mixing machine, to facilitate completion of the reaction. Temperatures and reaction times conventionally used in making polyurethanes are suitable for this purpose. The resulting prepolymer is a viscous liquid or gum and contains free isocyanate groups, because the diisocyanate at this stage is present in greater than the stoichiometric amount required by the available hydroxyl groups of the polyester.

After the foregoing reaction between the diisocyanate and the polyester is essentially complete, the remainder of the polyester, that is, the remaining 55 to 10% of the total quantity of polyester or preferably the remaining 45 to 30% of polyester is added to the prepolymer. The hydroxyl groups of this additional polyester ordinarily immediately start to react with the isocyanate groups of the prepolymer, but before such reaction can advance to any appreciable extent we add the third essential ingredient, namely, the bifunctional amine. The amine, due to its high reactivity, will react with the isocyanate groups much more rapidly than will the additional polyester. Enough amine is used to bring the total amount of polyester and amine at least up to the amount required to consume all of the isocyanate groups. The reaction between the amine and the prepolymer will take place at room temperature although in practice we ordinarily prefer to heat the mixture (with kneading) to expedite the process. There is thus formed a gum resembling unvulcanized rubber, which is capable of being cured by additional diisocyanate. This gum is (a) stable when stored under atmospheric conditions and (b) free from a tendency to scorch easily when compounded with diisocyanate curative. The polymer is furthermore remarkable for its homogeneity and freedom from grainy, insoluble bodies. This stability and freedom from scorch, with simultaneous homogeneity and freedom from insoluble matter, are in surprising and striking contrast to what would usually be obtained if it were attempted to make a raw polymer from the same three ingredients by previously reported methods.

According to methods well known in the art, the raw gum obtained by this method can be converted into a readily vulcanizable material by compounding it with a small amount of polyisocyanate (e.g., 4–12 parts of a diisocyanate per 100 parts of gum). The thus compounded rubber (with or without other compounding ingredients such as fillers, e.g., carbon black, silica, starch, flock, etc.) may be cured or "vulcanized" in any desired form, usually in a mold under pressure, under the same conditions of time and temperature as are used to cure ordinary rubbers.

The cured products are remarkable for their superior properties. Substitution of this material for ordinary rubbers in articles usually made from ordinary rubbers, such as tires, belts (including textile processing aprons), etc., will be obvious to those skilled in the art, in view of the superior properties of the present materials.

The following examples will illustrate the invention in more detail.

*Example 1*

Starting materials:

(1) Polyester: a polyesterether prepared from adipic acid and triethylene glycol. Molecular weight=2010.
(2) p,p' - Diphenylmethane diisocyanate. Molecular weight=250.
(3) p,p'-Diaminodiphenylmethane. Molecular weight= 198. Commercially designated Tonox.

To 335 g. (0.167 mole) of the polyesterether preheated to 100° C. in the Plastograph [1] 63 g. (.252 mole) of diisocyanate was added and the ingredients were mixed 2 hours at a temperature of 115° C. At the end of this time 143 g. (0.071 mole) of preheated polyesterether was added to the above formed "prepolymer" and mixing continued at 115° C. for 10 minutes. At this point 11.9 g. (0.060 mole) of powdered Tonox was added and mixing continued another 4 minutes. The raw polymer thus obtained had a Mooney viscosity (ML-4/212° F.) of 39, and since it has no free isocyanate groups it can be stored in air for long periods with little or no change in viscosity.

The overall molar ratio of diisocyanate/polyesterether/Tonox in the raw polymer is 1.05/1.0/0.25. The prepolymer is composed of all the diisocyanate plus 70% of the polyesterether, the molar ratio diisocyanate/polyesterether in the prepolymer being 1.5/1.0.

The raw polymer was cured with 10 phr. of p,p'-diphenylmethane diisocyanate for 60 minutes at 145° C. to give a vulcanizate with the following physical properties:

Autographic stress strain:
   100% elong., p.s.i. ---------------------- 440
   200% elong., p.s.i. ---------------------- 710
   300% elong., p.s.i. ---------------------- 900
Scott tensile:
   P.s.i. ---------------------------------- 2490
   Percent elong. at break ----------------- 960
   Set ------------------------------------- 0.57
Tear, #/0.1" ---------------------------------- 20
Torsional hysteresis:
   R. T. ----------------------------------- 0.084
   280° F. --------------------------------- 0.055
Durometer ------------------------------------- 57

*Example 2*

Starting materials:
(1) Polyester, prepared from adipic acid and 70/30 mixture of ethylene and propylene glycols. Molecular weight=1850.
(2) p,p'-Diphenylmethane diisocyanate. Molecular weight=250.
(3) p,p'-Diaminodiphenylmethane. Molecular weight =198. Commercially designated Tonox.

A "prepolymer" was prepared in the Plastograph by reacting 370 g. (0.20 mole) of the polyester with 67.6 g. (0.27 mole) of the diisocyanate for 165 minutes at a temperature of 107–115° C. To this prepolymer was then added 162 g. (0.088 mole) of the same polyester, and 4

---

[1] The Plastograph is a mixer made by the Brabender Corp., Rochelle Park, N.J.

minutes later 9.64 g. (0.049 mole) of Tonox was added. The reaction mixture was held at about 120° C. for another 5 minutes in order to essentially complete the reactions occurring. The raw polymer was an air-stable rubbery material with a Mooney viscosity of 43.

In this example the overall molar ratio of diisocyanate/polyester/Tonox in the raw polymer is 0.94/1.0/0.17. The prepolymer is composed of all the diisocyanate plus 70% of the polyester, the molar ratio diisocyanate/polyester in the prepolymer being 1.35/1.0.

The raw polymer was cured with 8 phr. of p,p'-diphenylmethane diisocyanate for 1 hour at 145° C. to yield a useful vulcanizate with the following physical properties:

Autographic stress strain:
  100% elong., p.s.i. _____ 300
  200% elong., p.s.i. _____ 500
  300% elong., p.s.i. _____ 810
Scott tensile:
  P.s.i. _____ 3710
  Percent elong. at break _____ 730
  Set _____ 0.15
Tear, #/0.1" _____ 9
Torsional hysteresis:
  R. T. _____ 0.084
  280° F. _____ 0.048
  Durometer _____ 53

In this example polyesters made from ethylene and propylene glycols in any proportions may be substituted. Alkyl or aralkyl diisocyanates may be substituted. Aliphatic diamines, aminoalcohols, or aminophenols may be substituted. In fact, any conventional starting materials, as disclosed in the patents previously mentioned, may be substituted.

*Example 3*

This example does not illustrate the invention, but is included to show the unsatisfactory results obtained when the order of addition required by the invention is not followed.

(A) The materials used in making the raw rubber in Examples 1 or 2 are all mixed together substantially at the same time, and heated while working the mixture, as described. The product is a sticky non-homogeneous polymer, containing grainy, insoluble bodies, and it cannot be handled or compounded using conventional equipment.

(B) The materials used in making the raw rubber in Examples 1 or 2 are reacted in the following order: All of the polyester and diisocyanate are first reacted, after which the diamine is added. The raw polymer has widely varying characteristics, depending on how soon the diamine is added. If the diamine is added soon after the polyester and the diisocyanate are combined, the results are essentially the same as in (A), that is, a non-homogeneous raw polymer is obtained. On the other hand, if the diamine is not added until later, it is found that the resulting polymer scorches, even on a cool mill, when compounded for cure with further diisocyanate as described.

While it is not desired to limit the invention to any particular theory of operation, it appears possible that the unexpected success of the present order of reaction of the materials, in contrast to the other methods, is due at least in part to the fact that the present method, in effect, compensates for the widely different reaction rates of the isocyanate groups with the hydroxyl groups of the polyester on the one hand and the bifunctional amine on the other hand. Thus, the bifunctional amine reacts many times faster with isocyanate groups than do hydroxyl groups. This means that when all three ingredients (polyester, diisocyanate and bifunctional amine) are mixed together at the start, as in Example 3 (A), the diisocyanate reacts with the amine essentially completely before any appreciable reaction occurs with the polyester. This could very well account for the formation of insoluble bodies (possibly ureas and polyureas) which are found in the grainy, inhomogeneous product. On the other hand, in Example 3(B), the results either tend to be essentially the same as in Example 3(A), or there is a tendency to form a scorchy product, depending on whether the addition of the diamine is early or late. In other words, "too early" addition of diamine results in precipitation of insoluble matter as in Example 3(A); while "too late" addition gives a scorchy product. It is thought possible that such scorchiness is a consequence of amine end groups on the raw polymer. Such amine end groups could result from the fact that the bulk of the isocyanate groups could have been consumed by the polyester before the diamine was added. In any event, the observed fact is that it is virtually impossible to obtain satisfactory, reproducible results by such methods.

The present invention avoids the foregoing difficulties by, in effect, splitting the reaction with the polyester into two distinct stages. In the first such stage, a large portion, but not all, of the polyester is reacted with the isocyanate material in the absence of the bifunctional amine to form a prepolymer. This affords an ample opportunity for a desirable chain-lengthening reaction between the polyester and the diisocyanate, without interference from a competing bifunctional amine. In the second such stage, the remaining portion of the polyester is reacted with the isocyanate-containing prepolymer (the diisocyanate having been present in substantial stoichiometric excess in the first stage) while the bifunctional amine is also present. Under the conditions prevailing in this second stage, desired ureylene groups can be formed without the occurrence of inhomogeneity which appears to result from reaction of the amine with diisocyanate or low molecular weight polyester-diisocyanate products. In the second stage, it appears that such species are essentially absent. While the foregoing is offered as a plausible explanation of the surprising results obtained by the present method, it is understood that we do not desire to limit ourselves to any particular theory of operation. The polyurethane system is complex, and the foregoing explanation may well be an oversimplification of the mechanism involved.

In Examples 1 and 2, it will be noted that the diamine was added very shortly after the additional polyester was introduced, in order that the diamine would be present while there were still some isocyanate groups available, that is, before the additional polyester had an opportunity to consume the bulk of the available isocyanate groups in the prepolymer. In accordance with a modification of the invention, we frequently find it desirable to have a retarder present along with the additional polyester, by which we mean a retarder of the reaction between the polyester and the isocyanate-containing prepolymer. Such a retarder has the advantage of allowing more latitude in the time of addition of the diamine, that is, the diamine need not be added so soon after the additional polyester, and furthermore, reasonable variations in the time at which the diamine is added are possible without giving rise to undesired, erratic variations in the characteristics of the final product. For this purpose triphenyl phosphite or equivalent known retarding materials such as adipic acid or hydroquinone, etc., may be used. The following examples illustrate this modification of the invention.

*Example 4*

Starting materials.—Identical to Example 2:

A "prepolymer" was prepared by reacting 370 g. (0.20 mole) of polyester with 75 g. (0.30 mole) of diisocyanate for 90 minutes at 115° C. in the Plastograph. To this prepolymer was then added 3 g. of triphenyl phosphite and 5 minutes mixing time was allowed. Then 200 g.

(0.119 mole) of polyester was added, followed 20 minutes later by 10.7 g. (0.054 mole) of Tonox. Mixing was continued for 28 minutes to ensure completeness of the reaction. The raw polymer had a Mooney viscosity of 28.

The overall molar ratio of diisocyanate/polyester/Tonox in the raw polymer is 0.94/1.0/0.17. The molar ratio of diisocyanate/polyester in the prepolymer is 1.5/1.0, 63% of the total polyester being used in its preparation.

The raw polymer was cured with 8 phr. of p,p'-diphenylmethane diisocyanate for 1 hour at 145° C. and yielded a vulcanizate with the following properties:

Autographic stress strain:
   100% elong., p.s.i. _____ 335
   200% elong., p.s.i. _____ 575
   300% elong., p.s.i. _____ 980
Scott tensile:
   P.s.i. _____ 4830
   Percent elong. at break _____ 630
   Set _____ 0.08
Tear, #/0.1" _____ 10
Torsional hysteresis:
   R. T. _____ 0.071
   280° F. _____ 0.040
Durometer _____ 55

*Example 5*

This preparation is a duplicate of Example 4, except that the prepolymer and polyester were allowed to react for 9 minutes before the Tonox was added (as compared to 20 minutes in Example 4).

To complete the reactions occurring, heating at 130° C. was continued for 1 hour after Tonox addition. The raw polymer had a Mooney viscosity of 48 and when cured with 8 phr. of p,p'-diphenylmethane diisocyanate for 1 hour at 145° C. it yielded a vulcanizate with physical properties essentially identical to that of Example 4.

Examples 4 and 5 show that there is a wide interval during which the Tonox can be added without appreciably affecting the properties of the raw or cured polymer.

In general, it is observed that when the second portion of the polyester is added, the reaction mixture immediately begins to increase in viscosity. This increase is slow when a retarder is present. It is desirable to add the bifunctional amine soon after the second portion of the polyester, i.e., as close as possible to the time when the polyester is completely dispersed. It is observed that the final properties of the product are affected by the viscosity (or average molecular weight) of the system at the moment when the bifunctional amine is added. The retarder facilitates matters by slowing down the rate of change of viscosity, thereby allowing more leeway in the same time of addition. Reproducibly good results are therefore readily obtainable with the invention.

It is desired to point out that when the bifunctional amine is added it often tends to counteract the effect of the retarder, permitting the now desired reaction of isocyanate with the polyester to proceed readily. Therefore, the use of the retarder as described need not appreciably increase the overall time required for the preparation. This is in contrast to what would occur if it were attempted to control the viscosity of the product by combining all of the polyester with the diisocyanate, with the retarder present in the first instance. In that event, impractically long times would be required for the reaction.

If desired, a catalyst for the reaction between the polyester and the diisocyanate may be present during the first stage. For this purpose tertiary amines or equivalent known catalysts such as cobalt naphthenate, etc., may be used.

Because of the chemical nature of certain accelerators and retarders it is possible to use both in the same procedure. For example, a tertiary amine can be used to accelerate the reaction between the initial increment of the polyester and the diisocyanate to form the prepolymer. When this reaction is complete, adipic acid can be added—more than enough to neutralize the tertiary amine—and the excess acts as a retarder for the subsequent steps of the reaction. This combined use of retarders and accelerators removes restrictions on the choice of starting materials characteristic of conventional methods.

The added polyester introduced in the second stage need not be the same as the polyester introduced in the first step. For example, a certain polyester might be used in the first stage, and the additional polyester introduced in the second stage might take the form of a polyesterether. Mixtures of polyesters can be used in either stage.

From the foregoing it will be apparent that the invention affords numerous advantages. Because the invention utilizes bifunctional materials having at least one amine group, rubbery products having optimum properties are obtainable. In this respect the products of the present method are superior to those obtained with other bifunctional additives, such as glycols. The products of the present method are uniform from batch to batch, even on a large scale. This unique ability to reproduce desirable properties repeatedly is a consequence of the fact that the reaction between a large part of the polyester and all of the diisocyanate is brought to completion as a first step. This means that an absolutely definite, reproducible intermediate or prepolymer containing available isocyanate groups is always produced, assuming that the starting polyester and diisocyanate and their proportions are the same each time. The character of the intermediate or prepolymer, especially its molecular weight, in turn determines in large part the properties of the product. Hence, by insuring a definitely completed intermediate stage, as described, it is possible to obtain a definite final product. This is in contrast to other procedures wherein it is not possible as a practical matter to add a bifunctional material to a prepolymer of exactly predetermined molecular weight in each batch. As pointed out previously, such other procedures consequently give widely varying products from one batch to the next.

In the present method the process can be virtually stopped or interrupted at the conclusion of the first stage. This makes possible a desirable flexibility in production scheduling, not possible in other methods. The use of catalyst and retarders as described makes possible further desirable latitude in the process.

The choice of suitable starting materials in the present system is broad. Fast-reacting combinations of polyester and diisocyanate, unsuitable in the conventional methods, can be used in the present process. Unavoidable variability in the rate of reactivity of the polyester, a serious problem in conventional processes, is not a problem in the present process wherein (1) the reaction in the first stage is easily brought to completion regardless of the reactivity rate of the polyester, either by using catalysts or by allowing enough time without catalysts and (2) the use of retarder in the second step has a levelling effect and in essence makes various batches of polyesters react at essentially the same rate.

Having thus described our invention, what we claim and desire to protect by Letters Patent is:

1. A method of making a raw, stable polyurethane gum which is a reaction product of 1 mole of a polyester containing alcoholic hydroxyl end groups derived from a glycol and a dicarboxylic acid, from 0.06 to 0.48 mole of a primary amine that is bifunctional with respect to its ability to react with isocyanate groups, and from 0.8 to 1.5 mole of an organic diisocyanate, the sum of the active hydrogen atoms in the polyester and in the bifunctional amine being approximately equal to the number of equivalents of isocyanate, comprising mixing the polyester in two distinct stages with the diisocyanate, the first such distinct stage comprising initially mixing from 45 to 90% of the polyester with all of the diisocyanate whereby a prepolymer containing free isocyanate groups is formed and subsequently, after reaction between the polyester and diisocyanate is substantially complete, adding in a second distinct stage the remaining 55 to 10% of the polyester and mixing said remaining polyester intimately with the prepolymer, and thereafter, while said additional polyester is still present as such in the prepolymer, adding the said bifunctional amine, whereby there is formed a raw rubbery polyurethane polymer of predetermined desired characteristics, that is curable to an elastic, rubbery state by the action of heat and additional organic diisocyanate.

2. A method as in claim 1, in which the said polyester is made from adipic acid and a mixture of ethylene and propylene glycols.

3. A method as in claim 1, in which the said diisocyanate is p,p'-diphenylmethane diisocyanate.

4. A method as in claim 2, in which the said diisocyanate is p,p'-diphenylmethane diisocyanate.

5. A method as in claim 1, in which the said bifunctional material is p,p'-diaminodiphenyl methane.

6. A method as in claim 2, in which the said bifunctional material is p,p'-diaminodiphenyl methane.

7. A method as in claim 1, in which triphenyl phosphite is added to the prepolymer, prior to the addition of said additional polyester.

8. A method as in claim 2, in which triphenyl phosphite is added to the prepolymer, prior to the addition of said additional polyester.

9. A method as in claim 1, in which the said polyester is made from adipic acid and triethylene glycol.

10. A method of making a raw, stable polyurethane gum which is a reaction product of 1 mole of a polyester containing alcoholic hydroxyl end groups derived from a glycol and a dicarboxylic acid, from 0.06 to 0.48 mole of a primary amine that is bifunctional with respect to its ability to react with isocyanate groups, and from 0.8 to 1.5 mole of an organic diisocyanate, the sum of the active hydrogen atoms in the polyester and in the bifunctional amine being approximately equal to the number of equivalents of isocyanate, comprising mixing the polyester in two distinct stages with the diisocyanate, the first such distinct stage comprising initially mixing from 55 to 70% of the polyester with all of the diisocyanate whereby a prepolymer containing free isocyanate groups is formed and subsequently, after reaction between the polyester and diisocyanate is substantially complete, adding in a second distinct stage the remaining 45 to 30% of the polyester and mixing said remaining polyester intimately with the prepolymer, and thereafter, while said remaining polyester is still present as such in the prepolymer, adding the said bifunctional amine, whereby there is formed a raw rubbery polyurethane polymer of predetermined desired characteristics, that is curable to an elastic, rubbery state by the action of heat and additional organic diisocyanate.

11. A method as in claim 10 in which the said polyester is made from adipic acid and a mixture of ethylene and propylene glycols, the said diisocyanate is p,p'-diphenylmethane diisocyanate, and the said bifunctional material is p,p'-diaminodiphenyl methane.

References Cited in the file of this patent

UNITED STATES PATENTS

| | | |
|---|---|---|
| 2,621,166 | Schmidt et al. | Dec. 9, 1952 |
| 2,625,531 | Seeger | Jan. 13, 1953 |
| 2,625,532 | Seeger | Jan. 13, 1953 |
| 2,729,618 | Muller et al. | Jan. 3, 1956 |
| 2,753,319 | Brockway | July 3, 1956 |
| 2,779,689 | Reis | Jan. 29, 1957 |